Aug. 10, 1965     C. L. CALLUM ETAL     3,199,796
PORTABLE FEED GRINDER AND MIXER
Filed May 27, 1963     3 Sheets-Sheet 2
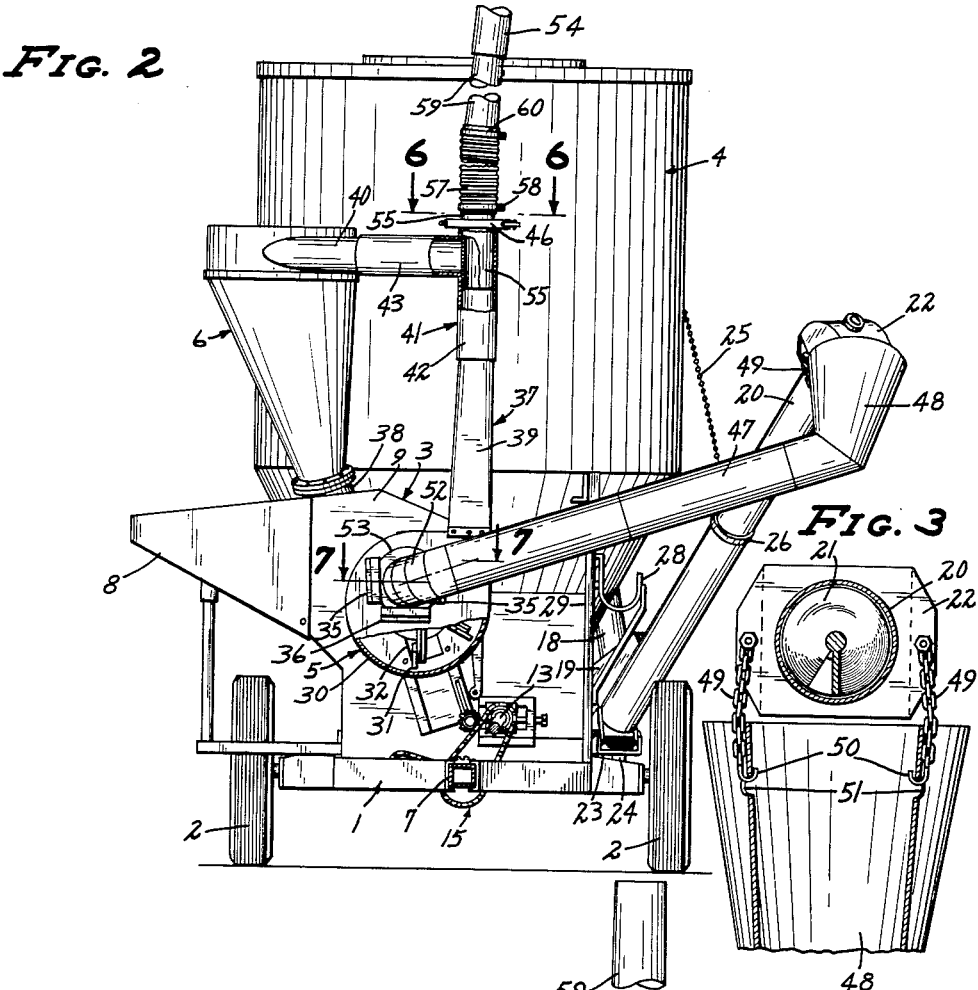
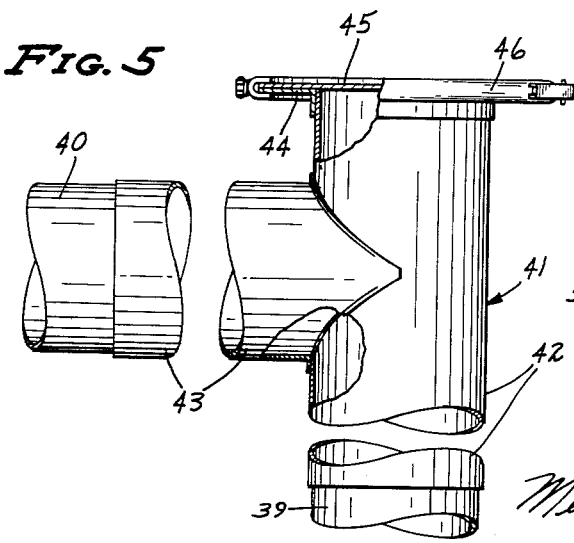
INVENTOR.
CHARLES L. CALLUM
DONALD T. SORLIE
BY
ATTORNEYS Aug. 10, 1965 C. L. CALLUM ETAL 3,199,796
PORTABLE FEED GRINDER AND MIXER
Filed May 27, 1963 3 Sheets-Sheet 3

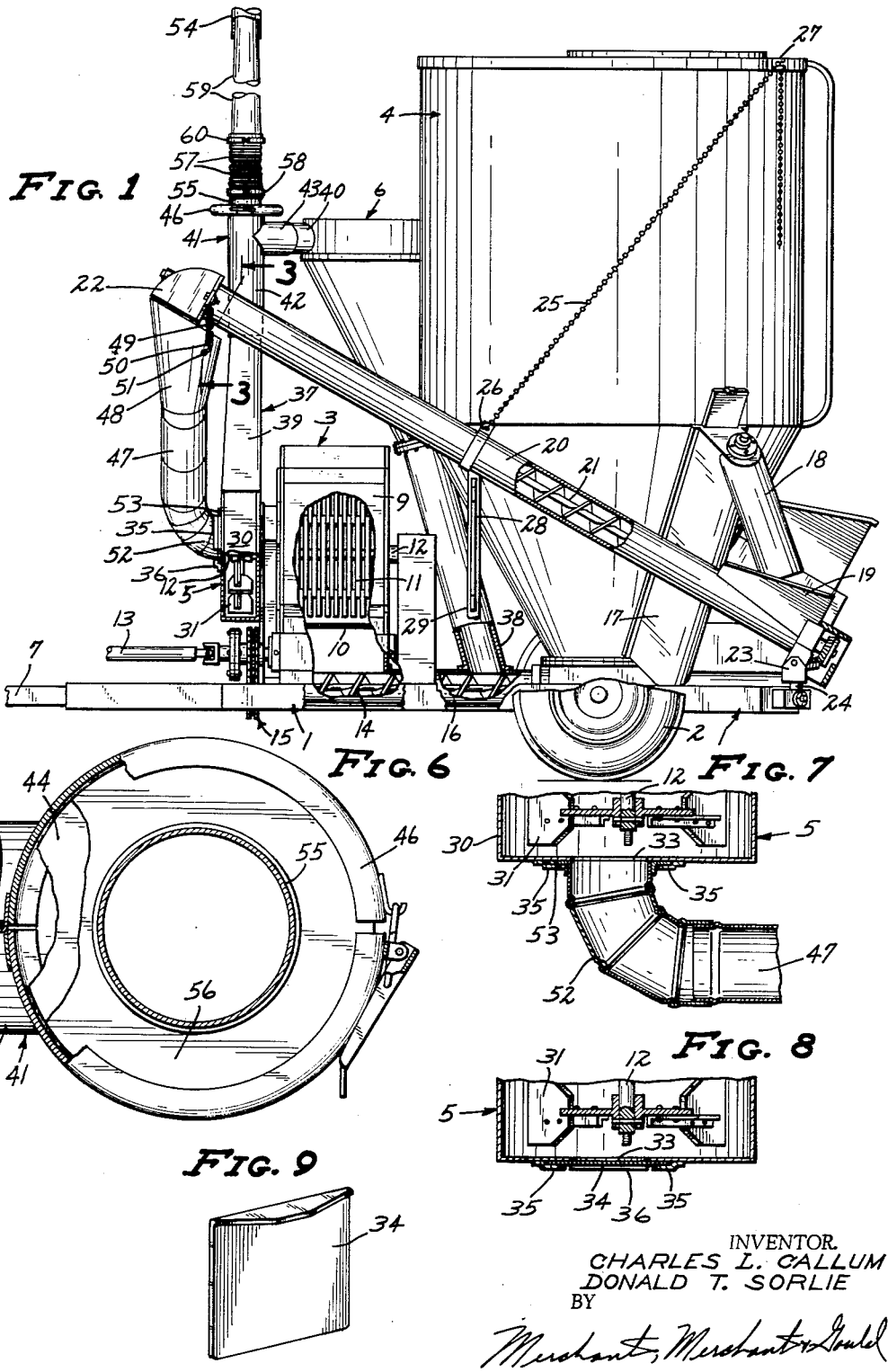

INVENTOR.
CHARLES L. CALLUM
DONALD T. SORLIE
BY
Merchant, Merchant & Gould
ATTORNEYS United States Patent Office 3,199,796
Patented Aug. 10, 1965

3,199,796
PORTABLE FEED GRINDER AND MIXER
Charles L. Callum and Donald T. Sorlie, Hopkins, Minn., assignors to Daffin Corporation, Hopkins, Minn., a corporation of Delaware
Filed May 27, 1963, Ser. No. 283,420
6 Claims. (Cl. 241—101)

Our invention relates generally to apparatus for grinding and mixing bulk material, and more particularly, to portable feed grinders and mixers used in the preparation of animal foods.

More specifically, this invention relates to improvements in, or attachments for, portable grinding mills and feed mixers of the type which utilizes a blower for removing chaff or other like material from the grinding mill, and an air-dust separator which receives the material from the blower and delivers said material to the stream of feed flowing from the grinding mill to the mixing tank.

Heretofore, portable combination feed grinders and mixers have been provided with elongated auger equipped feed discharge conveyors for delivering the ground and mixed feed to storage bins, bunk or other type feeders, transport vehicles or the like. It has been found, in many instances, the usual discharge conveyors of the grinding and mixing machine have not been of sufficient length to easily reach the point of delivery, such as the inlet openings of tall or elevated storage bins and the like, these discharge conveyors usually being from ten to fifteen feet long, and the inlet openings of some storage bins being as much as thirty feet above the ground.

An important object of our invention is the provision of novel means for utilizing the above-mentioned blower as a source of power to impel the mixed material from the mixing tank to a remote point of delivery normally inaccessible to the usual delivery or discharge conveyor.

Another object of our invention is the provision of an attachment for machines of the type above-described, which will selectively adapt the machine for delivery of mixed material by the usual auger-equipped discharge conveyor and by using the blower fan as an impeller to throw the mixed material to the point of delivery.

Yet another object of our invention is the provision of an attachment by means of which the method of delivery of the mixed material may be quickly and easily changed, without the use of tools.

Another object of our invention is the provision of a portable feed grinder and mixer including a blower and an air-dust separator for the purpose above set forth, having noval means for connecting the inlet portion of the blower to the delivery portion of the discharged conveyor, and means for intercepting the material between the blower and separator for delivery of the material in a direction away from the separator.

Still another object of our invention is the provision of means, as set forth immediately above, which are simple and inexpensive to produce, which are highly efficient in operation, and which are rugged in construction and durable in use.

The above, and still further highly important objects and advantages of our invention will become apparent from the following detailed specification, appended claims and attached drawings.

Referring to the drawings, which illustrate the invention, and in which like reference characters indicate like parts throughout the several views:

FIG. 1 is a view in side elevation of a portable feed grinder and mixer showing our attachment applied thereto, some parts being broken away and some parts being shown in section;

FIG. 2 is a view in front elevation, some parts being broken away and some parts being shown in section;

FIG. 3 is an enlarged fragmentary section taken substantially on the line 3—3 of FIG. 1;

FIG. 4 is a view in side elevation of a material intercepting conduit section of our invention;

FIG. 5 is a view in front elevation corresponding to a portion of FIG. 2, on an enlarged scale, some parts being broken away and some parts being shown in section;

FIG. 6 is an enlarged fragmentary view partly in plan and partly in horizontal section, taken substantially on the line 6—6 of FIG. 2;

FIG. 7 is an enlarged fragmentary section taken substantially on the line 7—7 of FIG. 2;

FIG. 8 is a view corresponding to FIG. 7 but showing a conveyor chute removed from the blower and a closure plate applied thereto;

FIG. 9 is a view in perspective of the closure plate illustrated in FIG. 8 and;

Figure 10:
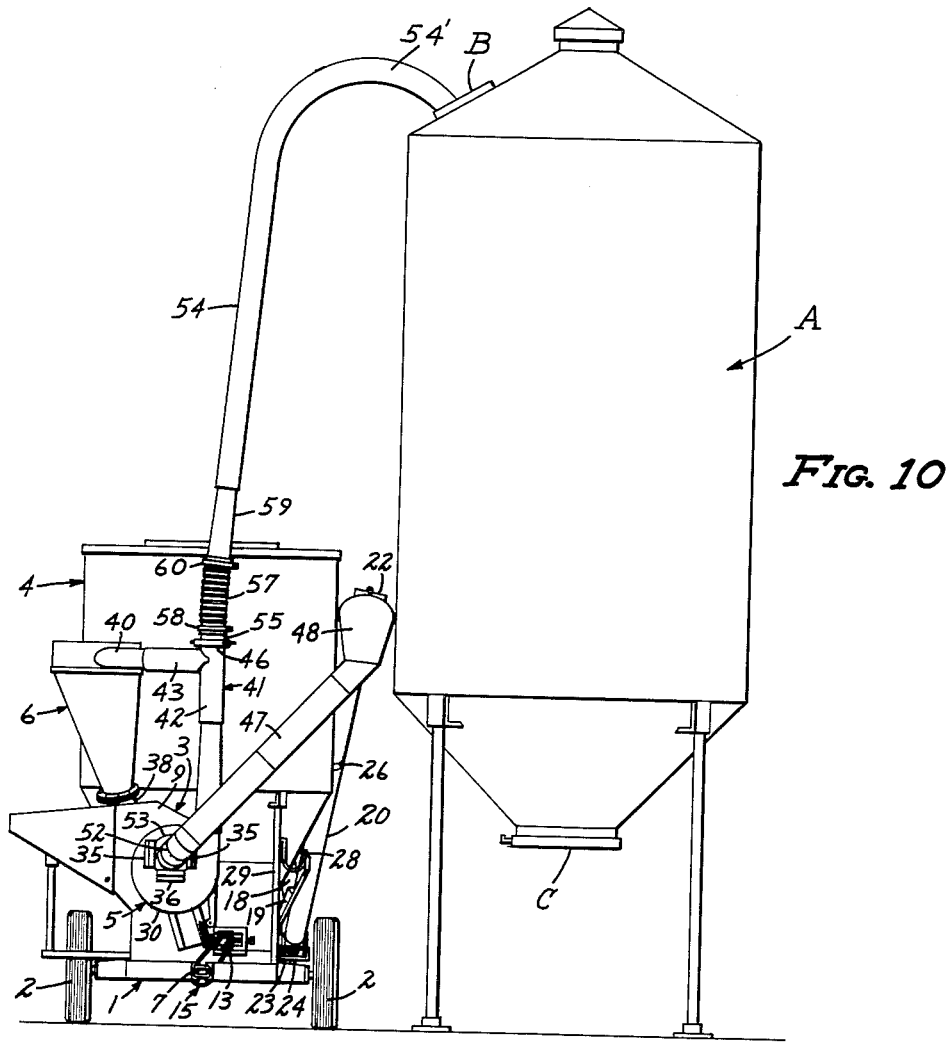
FIG. 10 is a view corresponding generally to FIG. 2 on a reduced scale, and illustrating the use of the machine in delivering feed material to a remote point of delivery.

Referring with greater detail to the drawings, a portable feed grinder or mill and mixer is shown as comprising, a horizontal frame 1 supported by pneumatic tire equipment 2, a grinding mill 3 mounted on the frame 1, a mixing tank 4 rearwardly of the grinding mill 3, a blower 5, and an air-dust separator 6. The frame 1 is provided with a conventional forwardly extending hitch bar 7, fragmentarily shown in FIGS. 1 and 2, that is adapted to be connected to the drawbar of a tractor or other towing vehicle, not shown.

The blower 5 involves a receiving hopper 8, a housing 9, a screen 10, and a hammermill rotor assembly 11 mounted on a shaft 12 suitably journalled in the frame structure and driven by conventional means including a drive shaft 13 that is adapted to be operatively coupled to the power take-off unit of the towing vehicle, not shown. Driving connections between the drive shaft 13 and the hammermill shaft 12 are not shown, these being well known in the art. Material ground by the grinding mill 3 is received by a feeding auger 14 which delivers the material rearwardly to the bottom of the mixing tank 4, the feeding auger 14 being driven from the drive shaft 13 by sprocket and chain connections indicated generally at 15. As shown in FIG. 1, in the feeding auger 14 passes rearwardly from the grinding mill 3 through a feed tube 16 to the mixing tank 4.

In normal use, feed is discharged from the mixing tank 4 by means of an elevator, not shown, but contained within a housing 17, from whence the material flows by gravity downwardly through a tubular chute 18 to the hopper end 19 of a tubular discharge conveyor 20 having an auger 21 mounted therein and driven by conventional means including a pair of beveled gears adjacent the hopper end of the discharge conveyor tube 20. At its upper discharge end, the discharge conveyor tube 20 is provided with a generally downwardly opening hood 22. The lower hopper end of the discharge conveyor tube 20 is pivotally mounted on a bracket 23 for swinging movements of the discharge conveyor 20 about a horizontal axis, the bracket 23 being provided with a depending leg 24 that is journalled in the frame 1 for swinging movements of the bracket around a generally vertical axis, whereby a universal connection is made between the discharge conveyor 20 and the frame 1. The discharge conveyor 20 is adjustably supported by means of a link chain or the like 25 secured at its lower end to a collar or band 26 encircling the discharge conveyor tube 20 intermediate its ends, the chain 25 being longitudinally adjustably secured in a suitable bracket 27 at the upper end of the tank 4. In a storage position, the discharge conveyor tube 20 is supported in a bracket 28 that is secured to a supporting leg 29 for the tank 4.

The blower 5 comprises a blower housing 30 having mounted therein a fan 31 preferably mounted on the shaft 12 for common rotation therewith, the blower housing 30 having inner and outer inlet openings 32 and 33 respectively, the former of which establishes communication between the interior of the blower housing 30 and the interior of the grinding mill housing 9, and the latter of which opens to atmosphere opposite the grinding mill 3 and which is adapted to be closed by a closure plate 34 removably slidably mounted in generally vertically disposed guide members 35 that are welded or otherwise rigidly secured to the adjacent wall of the housing 30. A generally horizontally disposed guide and stop member 36, below the inlet opening 33, limits downward sliding movements of the closure member 34. During operation of the grinding mill 3, lightweight chaff and dust particles are drawn into the housing 30 from the grinding mill 3 through the inlet opening 32 and discharged from the housing 30 through a duct 37 to the air-dust separator 6 from whence the separated chaff and dust particles are delivered to the auger 14 through a delivery tube or the like 38 rearwardly of the grinding mill 3, see FIG. 1. The duct 37 comprises a pair of duct sections 39 and 40 connected by a T-shaped fitting 41, the duct section 39 extending to the outlet portion of the blower 5, the duct section 40 extending to the separator 6. The fitting 41 comprises an elongated tubular leg 42, one end of which is connected to the duct section 39, and a transverse tubular leg 43 communicating with the leg 42 intermediate its ends and connected to the duct section 40. The upper end of the tubular fitting leg 42 is provided with an annular flange 44, and is normally closed by a plate-like closure element 45 that is releasably clamped to the flange 44 by an annular clamping device 46 of conventional structure.

During normal use of the above-described machine, the various ingredients to be ground and/or mixed are introduced to the mixing tank 4, the material to be ground being fed to the grinding mill 3 via the receiving hopper 8, from whence the ground material is fed to the mixing tank 4 by the feeding auger 14. Other types of feed material, not desired to be ground, are fed to the mixing tank 4 by other feeding means, not shown, and the materials are thoroughly mixed in the tank 4. The machine is then moved to the place of delivery and the mixed material is discharged from the tank 4 through the conveyor means within the housing 17, the tubular chute 18 and the discharge conveyor 20. However, in some instances, and as above indicated, the receiving point for the mixed material is disposed above or out of the reach of the discharge conveyor. Such an instance is illustrated in FIG. 10, a storage bin being indicated at A, and having an inlet B at its upper end and a discharge portion C at its lower end. For the purpose of greatly extending the discharge capabilities of the machine so that delivery of the material may be made to more remote points, such as the inlet B, we provide novel attachment means for the machine, now to be described.

A tubular chute 47 is formed at one end to provide a hopper-like receiver 48 that is adapted to be removably suspended from the hood portion 22 of the discharge conveyor 20 by means of link chains 49 rigidly secured at their upper ends to the hood 22, and which are provided at their lower ends with hooks 50 receivable in apertures 51 in the receiver 48, see particularly FIGS. 1 and 3. At its opposite end, the tubular chute 47 is provided with an elbow 52 that is equipped with a flange 53 receivable in the guide members 35 and 36, when the closure plate 34 is removed, to establish communication between the delivery end of the discharge conveyor 20 and the inlet 33 of the grinding mill 3. Thus, all of the material discharged from the mixing tank 4 is delivered to the inlet portion of the blower 5.

When the chute 47 is attached to a machine, as immediately above-described, the blower 5 operates as an impeller for the ground and mixed feed, the attachment means further involving delivery duct means including a duct section 54 having a curved delivery end 54' adapted to be inserted into the inlet B and flexible connector means including a tubular sleeve 55 having an annular flange 56 at its uper end portion, a flexible tube section 57, clamped or otherwise secured at one end to the upper end of the sleeve 55, as indicated at 58, and a tapered tube section 59 having its larger diameter end clamped to the adjacent end of the flexible tube section 57, as indicated at 60. As shown in FIG. 1, the tapered tube section 59 is adapted to be snugly received in the adjacent end of the delivery duct 54.

As shown in FIG. 2, when the closure element 45 is removed from the fitting 41, the sleeve 55 may be inserted into the tubular leg 42 with the flange 56 resting on the annular flange 44 of the fitting 41, the annular clamp 46 being utilized to lock the flanges 56 and 44 in face-to-face engagement. The sleeve 55 extends downwardly into the leg 42 of the fitting 41 across the passage defined by the transverse fitting leg 43 to shut off flow of material to the leg 43 and duct section 40, whereupon the material will be impelled upwardly through the sleeve 55, flexible tube section 57 and tapered tube section 59 into the delivery duct 54, and from thence to the point of delivery, by the fan 31, rotating at its normal high speed.

From the above, it will be seen that the instant machine may be quickly and easily converted from one method of delivery of the mixed feed to the other, the blower 5 serving the dual function of removing chaff and dust particles from the grinding mill during the grinding operation, and providing the impelling force for delivery of the mixed feed during the delivery operation. By adapting the machine as above described, and using the fan 31 as an impeller rotor, we have been able to deliver mixed feed to storage bin inlets at a height of forty feet without difficulty.

While we have shown and described a commercial embodiment of portable feed grinder and mixer and delivery attachment therefor, it will be understood that the same is capable of modification without departure from the spirit and scope of the invention, as defined in the claims.

What we claim is:

1. An attachment for portable feed mills and mixers of the type involving, a grinding mill, a mixing chamber for reception of material from said mill, a discharge conveyor exteriorly of said chamber and having an inner end communicating with the chamber and a delivery end remote therefrom for delivery of mixed material from said chamber, a blower for removal of dust from said mill, an air-dust separator, and a duct extending from said blower to said separator, said attachment comprising, (a) a chute, (b) means for releasably attaching one end of said chute to the delivery end of the discharge conveyor and the other end of the chute to an inlet portion of the blower for delivery of mixed material to said blower, (c) and means including a delivery conduit adapted to be operatively connected to the discharge portion of said blower for intercepting the flow of material from the blower toward the separator and directing said flow of material away from the separator.

2. In a portable feed mill and mixer involving, a grinding mill, a mixing chamber for reception of ground material from said mill, and a discharge conveyor exteriorly of said chamber and having an inner end communicating with the chamber and a delivery end remote therefrom for delivery of mixed material from said mixing chamber, (a) a blower operatively associated with said mill for removal of dust therefrom and having an auxiliary inlet opening and a closure for said auxiliary opening,
(b) an air-dust separator for delivery of solids from said mill to said mixing chamber,
(c) duct means between said blower and said separator,
(d) a chute,
(e) means for releasably attaching one end of said chute to said discharge conveyor and the other end thereof to said blower for delivery of mixed material from said chamber to said blower through said auxiliary inlet when said closure is removed,
(f) and means including a delivery conduit adapted to be operatively connected to the discharge portion of said blower for intercepting the flow of material from said blower and directing said flow of material away from said air-dust separator.

3. An attachment for portable feed mills and mixers of the type involving a grinding mill, a mixing chamber for reception of material from said mill, a discharge conveyor exteriorly of said chamber and having an inner end communicating with the chamber and a delivery end remote therefrom for delivery of mixed material from said chamber, a blower for removal of dust from said mill, an air-dust separator, and a duct extending from said blower to said separator, said attachment comprising,
(a) a chute,
(b) means for releasably attaching one and of said chute to the delivery end of the discharge conveyor and the other end of the chute to an inlet portion of the blower for delivery of mixed material to said blower,
(c) and means including a delivery conduit for directing flow of material away from said separator and a tubular sleeve providing an inlet for said delivery conduit, said sleeve being adapted to be inserted into a portion of said duct intermediate said blower and separator and operative to shut off flow of material to said separator and direct flow of material into said delivery conduit, 4. In a portable feed mill and mixer involving, a grinding mill, a mixing chamber for reception of ground material from said mill, and a discharge conveyor exteriorly of said chamber and having an inner and communicating with the chamber and a delivery end remote therfrom for delivery of mixed material from said mixing chamber,
(a) a blower operatively associated with said mill for removal of dust therefrom and having an auxiliary inlet opening and a closure for said auxiliary opening,
(b) an air-dust separator for delivery of solids from said mill to said mixing chamber,
(c) duct means between said blower and said separator comprising a pair of angularly displaced duct connections one extending to said separator and the other to said blower, and a fitting interconnecting said sections and having an opening therein,
(d) a chute,
(e) means for releasably attaching one end of said chute to said discharge conveyor and the other end thereof to said blower for delivery of mixed material from said chamber to said blower through said auxiliary inlet when said closure is removed,
(f) end means including a delivery conduit having a portion for insertion into said opening in said fitting to shut off flow of material to said separator and direct said flow to said delivery conduit in a direction away from said separator.

5. The structure defined in claim 4 in which said fitting comprises a hollow T-shaped member having an elongated generally straight leg and a transverse leg intermediate the ends of said elongated leg, one end of said elongated leg being connected to the duct section extending to said blower, said transverse leg being connected to the duct section extending to said separator, the other end of said elongated leg defining said opening in the fitting, and in further combination with a displaceable closure element for said opening in the fitting.

6. The structure defined in claim 5 in further combination with lock means for releasably locking said closure element to said other end of the leg, said portion of the delivery conduit comprising a tubular sleeve telescopically received in said elongated leg, upon displacement of said closure element, and extending across and shutting off the passage defined by said transverse leg, said lock means having locking engagement with said delivery conduit to releasably hold said sleeve within said fitting.

References Cited by the Examiner
UNITED STATES PATENTS

| 1,100,959 | 6/14 | Dick. | |
| 1,702,248 | 2/29 | Crites | 241—56 R |
| 2,926,477 | 3/60 | Bebow. | |
| 3,105,722 | 10/63 | Thompson | 302—60 |
| 3,133,727 | 5/64 | Luscombe | 241—98 R |

J. SPENCER OVERHOLSER, *Primary Examiner.*